United States Patent Office 2,713,045
Patented July 12, 1955

2,713,045
PREPARATION OF PEPTIDES

Theodor Wieland, Mainz, and Richard Sehring, Ingelheim am Rhein, Germany, assignors to "C. H. Boehringer Sohn," Ingelheim am Rhein, Germany, a partnership No Drawing. Application March 15, 1951, Serial No. 215,865

Claims priority, application Germany March 21, 1950

5 Claims. (Cl. 260—112)

This invention is concerned with improvements in or relating to production of peptides starting from either aminoacids or peptides which have lower molecular weights than the peptides to be produced.

The synthesis of peptides is normally carried out by means of the reaction of $\alpha$-halogen fatty acid chlorides with free aminoacids or aminoacid esters and subsequent conversion of the $\alpha$-halogen into an amino group. Aminoacid chlorides or azides can however also be reacted with aminoacid esters or free aminoacids, in which the amino groups of the first components are protected by groups capable of being readily split off, as for example carbobenzoxy, phthalic acid or toluene sulphonic acid groups.

Recently Chantrenne has shown (see Nature, 164, 576 (1949)) that the anhydrides of carbobenzoxylated aminoacids and phenol phosphoric acid react in aqueous solutions with aminoacids with formation of peptides and release of phenylphosphate.

Besides these mixed organic-inorganic acid anhydrides, internal anhydrides of N-carboxyamino acids are also used for the production of peptides which on longer heating in the presence of hydrogen ions polymerise to peptides or polypeptides with the splitting off of carbon dioxide (see F. Sigmund, F. Wessely, Hoppe-Seyler, 157, 91 (1926); H. Leuchs, Ber. 39, 857 (1906); R. B. Woodward, O. H. Schramm, J. Am. Chem. Soc. 69, 1551 (1947)). This polymerisation is difficult to regulate and does not lead to uniform, well defined end products.

According to the present invention we provide a process for the preparation of peptides in which anhydrides of aminoacids or peptides of lower molecular weight than the peptides to be prepared and a carboxylic acid, and having the general formula:

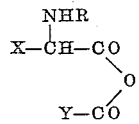

are reacted with aminoacids or peptides of lower molecular weight than the peptides to be prepared, or their esters, of the general formula: $H_2$—N—Z by addition of the calculated quantities of the base, to yield peptides of the general formula:

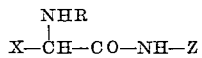

In the above formulae R is an alkyl, aralkyl, acyl, or other residue suitable for the protection of an amino group, capable of being subsequently readily split off again, X is any organic residue as is present in aminoacids or peptides, Y is a hydrogen atom, or an alkyl, aryl, aralkyl, alkoxy or similar group and Z is a residue present in the reacting amino group of the amino acid or peptide employed.

In the reaction of the anhydrides employed according to the invention with aminoacids, peptides of lower molecular weight or their esters, the salt or the ester of the desired peptides results by the addition of the base, together with the salt of the carboxylic acid forming the basis of the anhydrides in question, according to the following reaction equation:

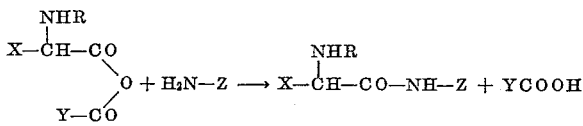

The anhydrides employed react very rapidly both in the solid state and also dissolved in an inert solvent, with aminoacids or peptides of lower molecular weight, on the addition of the calculated quantities in dilute alkali to yield the desired peptides.

The anhydrides required for the carrying out of the process according to the invention can be readily obtained from salts of aminoacids with inorganic or organic bases, and the organic acid chlorides, e. g. acetylchloride, benzoylchloride. They can be prepared with especial advantage from the silver salts of the acylated aminoacids or peptides of lower molecular weight, by shaking for a short time with acetylchloride or benzoylchloride in an inert solvent, for which purpose benzonitrile is especially suitable. After separation of the silver chloride they can be precipitated from the clear solution with petrol-ether as crystals. They are relatively stable compounds which can be readily handled.

In the carrying out of the process according to the invention it is not necessary to isolate the anhydride in every case. The anhydride produced in anhydrous medium can also be reacted directly with the solution of an aminoacid, a peptide of lower molecular weight or their ester.

The process according to the invention can be applied to any desired aminoacid or peptide of lower molecular weight. By the use of dipeptide anhydrides and aminoacids or their esters, or of aminoacid anhydrides and dipeptides or their esters, tripeptides or their esters are obtained. By the repetition of this reaction with suitable selection of the components used the synthesis of any polypeptide is possible.

The process according to the invention shows numerous advantages over the known methods of preparation for peptides. In particular the production of unstable aminoacid chlorides or azides is avoided.

In order that the invention may be well understood the following examples are given only as illustrations.

EXAMPLE 1

*Production of carbobenzoxy-dl-alanyl-dl-phenylalanine*

3.2 g. carbobenzoxy-dl-alanine benzoate were stirred into a solution of 1.5 g. dl-phenylalanine in 5 cc. aqueous 2 N caustic soda to which was added 1 drop of phenolphthalein solution. The colour of the indicator disappeared immediately and the solution became alkaline after additional 4.8 cc. 2 N caustic soda had been added dropwise with thorough agitation. It was now made acid to Congo red with dilute hydrochloric acid and steam blown through the hot solution for 15 minutes to remove the benzoic acid. The clear solution (25 cc.) precipitated 2.5 g. of the carbobenzoxydipeptide on cooling of M. P.$=139°$ C.

$C_{20}H_{22}O_5N_2$ (370.2)

Calculated: C, 64.83; H, 6.00; N, 7.56.
Found: C, 64.54; H, 5.91; N, 7.64.

EXAMPLE 2

*Production of phthalylglycylglycinemethyl ester*

0.5 g. phthalylglycine benzoate dissolved in 5 cc. ether were shaken for ten minutes with a solution of 0.15 g.

glycine methyl ester in 5 cc. saturated aqueous bicarbonate solution. After separation from the aqueous solution the ether was dried with sodium sulphate, filtered and evaporated off. A crystalline mass of M. P.=202° C. remained behind.

$C_{13}H_{12}O_5N_2$ (276.1)
Calculated: C, 56.5; H, 4.38; N, 10.14.
Found: C, 56.69; H, 4.65; N, 10.09.

EXAMPLE 3

*Production of carbobenzoxyglycyl-dl-alanine*

2 g. carbobenzoxyglycine in 5 cc. benzonitrile and 1.1 g. ethyl piperidine were mixed with 1.4 g. benzoylchloride with ice cooling and allowed to stand for ten minutes at room temperature. This solution was then vigorously shaken with a solution of 0.9 g. dl-alanine in 5 cc. 2 N caustic soda during dropwise addition of a further 5 cc. 2 N caustic soda. The benzonitrile was then removed by extraction with ether, the aqueous layer was acidified with dilute hydrochloric acid, and after which the ether was removed therefrom by means of a short subjection to vacuum. The crystals separating out were filtered off and recrystallised from ethanol. 2 g. carbobenzoxy-dipeptide of M. P.=120° C. were obtained.

$C_{13}H_{16}O_5N_2$ (280.3)
Calculated: C, 55.7; H, 5.78; N, 10.0.
Found: C, 55.44; H, 6.13; N, 10.18.

EXAMPLE 4

*Production of carbobenzoxy-glycyl-alanyl-glycine*

1.9 g. carbobenzoxyglycine were reacted as given in the foregoing examples with a solution of 1.5 g. dl-alanyl-glycine and worked up as above. 2.2 g. carbobenzoxy-tripeptide of M. P.=145° C. were obtained.

$C_{15}H_{16}O_6N_3$ (337.2)
Calculated: C, 53.4; H, 5.7; N, 12.46
Found: C, 53.36; H, 5.49; N, 12.34

EXAMPLE 5

*Production of carbobenzoxy-glycyl-glycyl-dl-phenylalanine*

3.5 g. of the mixed anhydride obtained from the silver salt of carbobenzoxyglycylglycine with benzoyl chloride in benzonitrile were reacted with 1.2 g. dl-phenylalanine as above described. 2.5 g. plates of M. P.=129° C. were obtained.

$C_{21}H_{23}O_6N_3$ (413.2)
Calculated: C, 61.0; H, 5.37; N, 10.16.
Found: C, 61.3; H, 5.49; N, 9.74.

EXAMPLE 6

*Production of carbobenzoxy-dl-alanyl-dl-alanyl-dl-alanyl-glycine*

The carbobenzoxy-tetrapeptide was obtained from 2.16 g. carbobenzoxy-dl-alanyl-dl-alanine and 1.35 g. dl-alanylglycine in the above given manner after 30 minutes shaking of the organic solution with the aqueous alcoholic solution. It is very slightly soluble in ether, so that by acidification the precipitated benzoic acid can be removed by extraction in this solvent. On recrystallisation from methanol 2.5 g. of the peptide were finally obtained of M. P.=224° C. (dec).

$C_{19}H_{26}O_7N_4$ (422.2)
Calculated: C, 53.97; H, 6.29; N, 13.26.
Found: C, 54.32; H, 6.58; N, 12.85.

EXAMPLE 7

*Production of carbobenzoxytetraglycine using an alkoxy-carbonyl chloride*

3.23 g. carbobenzoxytriglycine are dissolved in 10 cc. tetrahydrofuran together with 1.4 cc. N-ethyl piperidine, cooled to 5° C. and mixed with 1.95 g. chlorcarbonic acid-n-octyl ester with vigorous stirring, during which the temperature should not rise above 5° C. After that the solution of 0.75 g. glycine in 10 cc. 2 N caustic soda is added without further cooling and with vigorous stirring, and is neutralised with dilute hydrochloric acid after ten minutes, stirring and then the solvent evaporated off in vacuo. The thick liquid residue is taken up in 20 cc. water, shaken with ether to remove the last traces of octylalcohol, freed of ether in vacuo and made just acid to Congo red with hydrochloric acid. The crude tetrapeptide (about 3 g.) is filtered off with suction and recrystallised in water.

Yield: 2.6 g. M. P.=220–225° C.
Calculated: N, 14.75.
Found: N, 14.94.

According to the present invention, therefore, there is provided a process for the preparation of peptides in which anhydrides of aminoacids or peptides of lower molecular weight than the peptides to be prepared and any desired carboxylic acid are reacted with approximately stoichiometric proportions of aminoacids or peptides of lower molecular weight than the peptides to be prepared, or their esters.

In the reaction of the anhydrides employed according to the invention with aminoacids, peptides of lower molecular weight or their esters, the salt or the ester of the desired peptide results by the addition of the base, together with the salt of the carboxylic acid combined with the anhydrides in question. This is illustrated by way of example by the following equation which relates to the production of carbobenzoxy-dl-alanyl-dl-phenylalanine by Example 1 of the process according to the invention.

$$\begin{array}{c} CH_3 \\ | \\ C_6H_5CH_2O-CONH-CH \\ | \\ CO + H_2N-CH-CH_2-C_6H_5 \longrightarrow \\ | \quad\quad | \\ O \quad\quad COONa \\ | \\ C_6H_5-CO \end{array}$$

$$C_6H_5-CH_2O-CONH-CH(CH_3)CONH-CH-CH_2C_6H_5 + C_6H_5COOH$$
$$| $$
$$COONa$$

The hydrides employed react very rapidly both in the solid state and also dissolved in an inert solvent, with aminoacids or peptides of lower molecular weight, on the addition of the calculated quantities in dilute alkali to yield the desired peptides.

What we claim is:

1. The method of producing a peptide containing at least one peptide group which comprises reacting a mixed external anhydride of a compound selected from the group consisting of monoamino-monocarboxylic acids and peptides containing at least one peptide group and a carboxylic acid selected from the group consisting of aliphatic, aromatic and aliphatic-aromatic carboxylic acids, with a compound selected from the group consisting of monoaminomonocarboxylic acids, peptides containing at least one peptide group and their esters, in substantially stoichiometric proportions, to form the desired peptide as a single reaction product, and separating the reaction product from the reaction mass.

2. The method of producing a peptide containing at least one peptide group which comprises reacting a mixed external anhydride of a monoamino-monocarboxylic acid and a carboxylic acid selected from the group consisting of aliphatic, aromatic and aliphatic-aromatic carboxylic acids, with a compound selected from the group consisting of monoamino-monocarboxylic acids, peptides containing at least one peptide group and their esters, in substantially stoichiometric proportions, to form the desired peptide as a single reaction product, and separating the reaction product from the reaction mass.

3. The method of producing a peptide containing at least one peptide group which comprises reacting a mixed external anhydride of a peptide containing at least one peptide group and a carboxylic acid selected from the group consisting of aliphatic, aromatic and aliphatic-aromatic carboxylic acids, with a compound selected from the group consisting of monoamino-monocarboxylic acids, peptides containing at least one peptide group and their esters, in substantially stoichiometric proportions, to form the desired peptide as a single reaction product, and separating the reaction product from the reaction mass.

4. The method of producing a polypeptide as in claim 1, wherein the materials are reacted with each other in the presence of an alkaline solution.

5. The method of producing a polypeptide as in claim 2, which comprises the additional steps of dissolving the mixed external anhydride in an inert organic solvent.

References Cited in the file of this patent

Anson et al., "Advances in Protein Chem." (Academic Press) vol. 5, pp. 41, 42, 45 and 46 (1949).

Wieland et al., Liebigs Ann., vol. 569, pp. 117–129 (1950).

Woodward et al., J. Am. Chem. Soc., vol. 69, pp. 1551–2, June 1947.

Bailey, Nature, vol. 164, p. 889, Nov. 19, 1949.

King et al., J. Chem. Soc. (London) pp. 3315–19, Dec. 1949.

Karrer, Org. Chem., 3rd Eng. ed., 1948, p. 213, Elsevier Pub. Co., Inc., New York.